United States Patent
Yang et al.

(10) Patent No.: US 9,819,079 B2
(45) Date of Patent: Nov. 14, 2017

(54) MODULAR ANTENNA FOR NEAR FIELD COUPLING INTEGRATION INTO METALLIC CHASSIS DEVICES

(75) Inventors: Songnan Yang, San Jose, CA (US); Anand S. Konanur, San Jose, CA (US); Hao-Han Hsu, Portland, OR (US); Changsong Sheng, Shanghai (CN); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 336 days.

(21) Appl. No.: 13/995,562

(22) PCT Filed: May 3, 2012

(86) PCT No.: PCT/US2012/036249
§ 371 (c)(1),
(2), (4) Date: Jun. 12, 2015

(87) PCT Pub. No.: WO2013/165421
PCT Pub. Date: Nov. 7, 2013

(65) Prior Publication Data
US 2015/0303561 A1     Oct. 22, 2015

(51) Int. Cl.
*H01Q 7/08* (2006.01)
*H01Q 1/52* (2006.01)
*H01Q 1/22* (2006.01)
*H04B 5/00* (2006.01)
*H01Q 7/00* (2006.01)

(52) U.S. Cl.
CPC .......... *H01Q 1/526* (2013.01); *H01Q 1/2266* (2013.01); *H01Q 7/00* (2013.01); *H04B 5/0031* (2013.01); *H04B 5/0037* (2013.01); *H04B 5/0081* (2013.01); *H01Q 7/08* (2013.01)

(58) Field of Classification Search
CPC ........ H01Q 5/385; H01Q 7/00; H01Q 9/0421; H02H 9/04
USPC .......................... 343/788, 895, 787, 741, 718
See application file for complete search history.

(56) References Cited

U.S. PATENT DOCUMENTS

| | | | | |
|---|---|---|---|---|
| 2006/0267853 | A1* | 11/2006 | Naito | G06K 19/07749 343/788 |
| 2008/0303735 | A1* | 12/2008 | Fujimoto | H01Q 1/22 343/787 |
| 2009/0111541 | A1* | 4/2009 | Kim | H01Q 9/0421 455/575.5 |
| 2010/0068999 | A1* | 3/2010 | Bangs | G06K 7/0008 455/41.1 |

(Continued)

*Primary Examiner* — Linh Nguyen
(74) *Attorney, Agent, or Firm* — Schiff Hardin LLP (57) ABSTRACT

Described herein are techniques related to near field communication and wireless power transfers. A portable device may include a modular antenna that offers consistent characteristics independent of integration environment. The modular antenna may include a continuous loop of coil antenna and a ferrite material that are encapsulated by a shield. The shield may form a "U" shape configuration to encapsulate the top layer coil antenna and the middle layer ferrite material in all three sides, which are defined by a bottom portion, an outer wall, and an inner wall. Furthermore, the shield may include an outer rim and an inner rim to maintain the same coil antenna characteristics in the modular antenna.

18 Claims, 6 Drawing Sheets

(56) References Cited

U.S. PATENT DOCUMENTS

| | | | |
|---|---|---|---|
| 2012/0075148 A1* | 3/2012 | Cho | G06K 19/0723 |
| | | | 343/702 |
| 2013/0127573 A1* | 5/2013 | Nakano | G06K 7/10009 |
| | | | 336/115 |
| 2014/0002313 A1* | 1/2014 | Yang | H01Q 1/22 |
| | | | 343/702 |
| 2014/0203990 A1* | 7/2014 | Konanur | H01Q 7/00 |
| | | | 343/866 |
| 2014/0266949 A1* | 9/2014 | Yokoyama | H01F 41/041 |
| | | | 343/788 |

* cited by examiner

MODULAR ANTENNA FOR NEAR FIELD COUPLING INTEGRATION INTO METALLIC CHASSIS DEVICES

BACKGROUND

Certain technologies allow near field coupling (e.g., wireless power transfers (WPT) and near field communications (NFC)) between portable devices in close proximity to each other. Such near field coupling functions may use radio frequency (RF) antennas in the devices to transmit and receive electromagnetic signals. Because of user desires (and/or for esthetic reasons) many of these portable devices are relatively small (and are becoming smaller), and tend to have exaggerated aspect ratios when viewed from the side. As a result, many of these portable devices incorporate flat antennas, which use coils of conductive material as their radiating antennas for use in near field coupling functions.

A typical NFC antenna configuration when integrated in a portable device may require tuning and adjustment of an antenna matching circuit (e.g., in NFC module) in the portable device. For example, the NFC antenna configuration may present a different behavior, such as antenna characteristics due to the integration environment. Accordingly, there is a need for an NFC antenna configuration that may present the same antenna behavior independent of the integration environment. For example, even though the NFC antenna is placed in a different chassis, the NFC antenna may no longer require re-certification in order to pass standard certification tests. The certification tests may include international organization standardization such International Organization for Standardization (ISO); Near Field Communications Forum (NFC Forum); Europay, MasterCard and VISA (EMVco); and Federal Communication Commission (FCC).

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for integrating a modular antenna in a portable device. In an implementation, the modular antenna may present the same antenna behavior (i.e., radio frequency characteristics) when integrated to different chassis in different portable devices. For example, the modular antenna may include a shield to protect the modular antenna from detuning due to metallic components in a host portable device. The shield may complete the host system's shielding to block electronic magnetic interference (EMI) emission from the system and or protect the system from electromagnetic static discharge (ESD) that may be presented due to the cutout created for NFC antenna. Furthermore, the shield encapsulates a ferrite material and an exposed coil antenna at a top layer of the modular antenna. In an implementation, the ferrite material may protect the coil antenna from the shield, which may include metallic materials. In this implementation, the exposed coil antenna may perform NFC related functions without re-adjusting or re-tuning an antenna matching circuit in an NFC module. In other implementations, the same modular antenna may be integrated on metal free outskirts of a trackpad area in a metal chassis device (e.g., an Ultrabook). For example, rather than implementing a cut-out in an EMI coating, the shield of the modular antenna may cover the entire area below the trackpad area of the device (e.g., Ultrabook).

Figure 1:
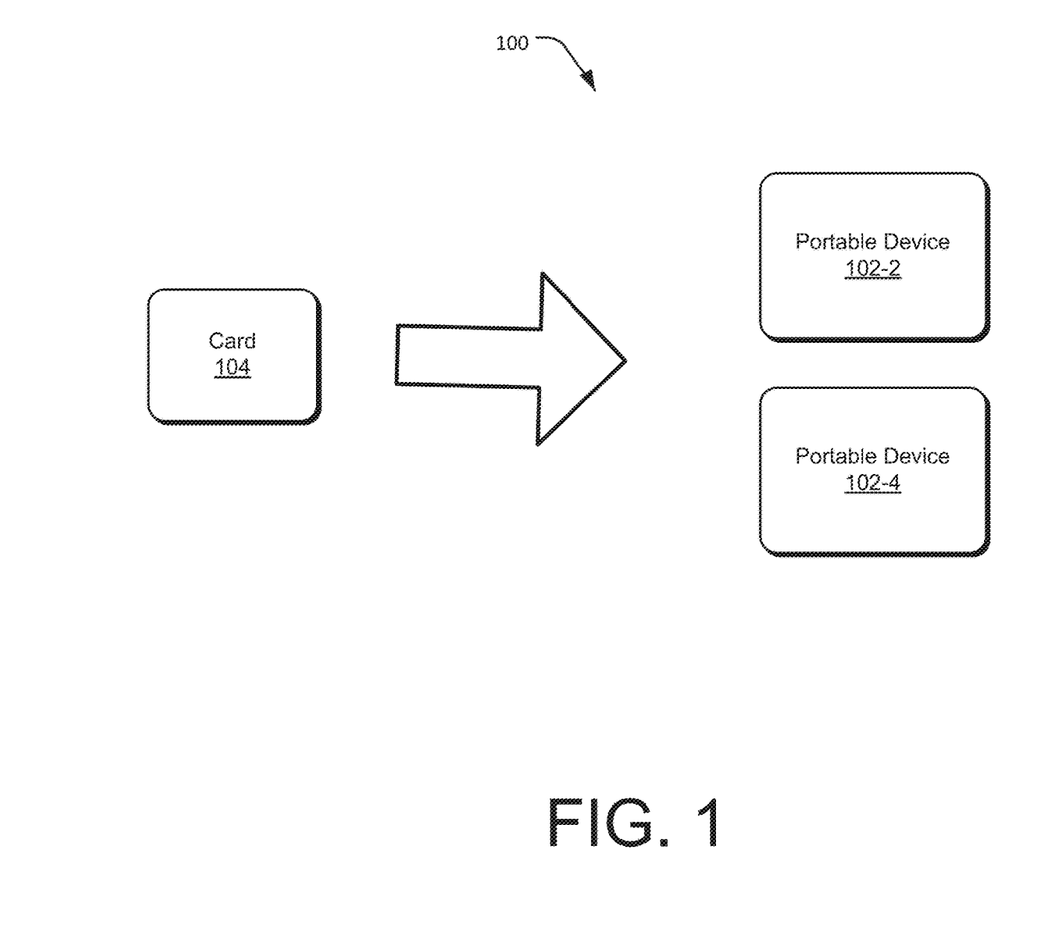
FIG. 1 illustrates portable devices in an example near field coupling arrangement.

FIG. 1 illustrates an example arrangement 100 of portable devices for near field coupling. More particularly, users may have a desire to operate near field coupling between enabled portable electronic devices and/or other devices in certain ergonomically convenient manners. Examples of such portable devices include, but are not limited to, Ultrabooks, tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

In an implementation, FIG. 1 shows two users (not shown) operating their NFC-enabled portable devices 102-2 and 102-4 to perform NFC-related information sharing functions. For example, a front-to-back or a back-to-back manner may be performed for the NFC communication. In an implementation, the portable devices 102 may accept information from a credit card 104 (or other similar device) through an NFC antenna (not shown). The portable devices 102 may implement an NFC antenna (not shown) having fix characteristics independent of placement location at the portable devices 102. For example, the fix characteristics of the NFC antenna (not shown) may avoid a RF tuning performed at an NFC module (not shown) after integration of the NFC antenna into the portable devices 102. This is a challenge for scaling of NFC technology, since the NFC antenna (not shown) may present different characteristics in each new notebook or portable devices 102. To this end, an NFC antenna configuration may be implemented at the portable devices 102 to avoid adjustment of the NFC module (not shown) after the NFC antenna integration.

In an implementation, the NFC antenna configuration may include a modular antenna (not shown) that maintains a stable characteristic regardless of integration environment. Further, the modular antenna may be configured to generate almost no impact on EMI or ESD solutions to ease the integration of the modular antenna into a wide variety of notebook/ultrabook designs.

Figure 2:
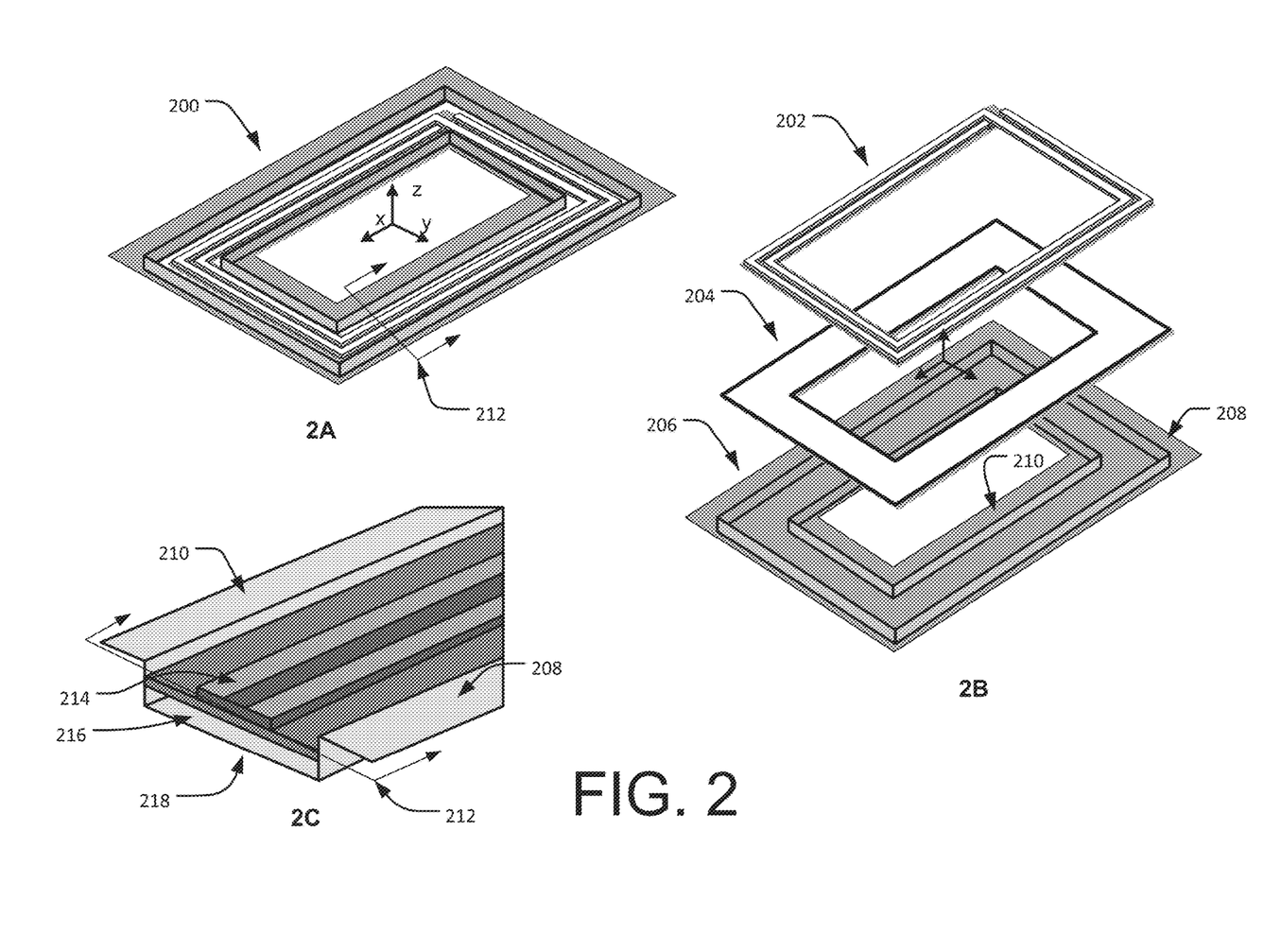
FIG. 2A illustrates a perspective view of a modular antenna.
FIG. 2B illustrates a perspective view of a disassembled modular antenna.
FIG. 2C illustrates a perspective cross-sectional view of a modular antenna.

FIGS. 2A and 2B respectively illustrates a perspective view of a modular antenna 200 and a perspective view of a disassembled modular antenna 200. In an implementation, the modular antenna 200 may include a universal antenna that offers consistent antenna characteristics independent of integration environment, such as in different locations at the portable device 102. The universal antenna embodiment may include a coil antenna 202, ferrite material 204, and a (metal) shield 206. In an implementation, the modular antenna 200 may provide the same characteristics (e.g., fix impedance) that may not be detailed or impacted by components of a host portable device 102. For example, a placement of the modular antenna 200 at the portable device 102 may be physically closed to or in contact with metallic components of the portable device 102. The metallic components may include a battery (not shown), a mother board (not shown), hard drives (not shown), and the like. In this example, the modular antenna 200 may maintain the same characteristics, such as the fix impedance to generate maximum power transfer between an NFC module (not shown) and the modular antenna 200 regardless of placement location of the modular antenna 200 at the portable device 102. In other implementations, the NFC module (not shown) may be integrated with the modular antenna 200 to form a single module. For example, the NFC module (not shown) may be located within the shield 206 and under the coil antenna 202 and the ferrite material 204. In this example, an opening on the side wall or bottom surface (not shown) of the shield 206 may be required for communications between the NFC module (not shown) and system motherboard (not shown). The interface for communications between the NFC module and the system motherboard, may be a printed circuit board (PCB), a flexible printed circuit (FPC), or wire connections. An additional grounding of the interface through the shield 206 may be added for further reductions of the ESD or EMI risk. For example, an ESD diode (not shown) may be added between the shield 206 and the coil antenna 202 to protect the NFC module (not shown). Furthermore, a thin slot may also be cut on the shield 206 to break the Eddy current generated on the shield, in reaction to current injected onto coil 202, in order to further improve the coil antenna performance.

With continuing reference to FIG. 2B, the coil antenna 202 may include a flat coil antenna in its design, so that (in part) the portable device 102 may possess desirable thin aspect ratios and small form factors. In an implementation, the modular antenna 200 may include a continuous loop of coil antenna 202 that is mounted on, embedded in, or otherwise associated with the ferrite material 204. In other implementations, a gap between the coil antenna 202 and the ferrite material 204 may be allocated. The coil antenna 202 may include a dedicated antenna for NFC and/or WPT purposes. In other words, the coil antenna 202 may be configured to operate on a separate resonant frequency (e.g., 13.56 MHz to implement NFC and/or WPT operations), and independent from another antenna that uses standard frequencies used in wireless communications (e.g., 5 GHz for WiFi signals). The coil antenna 202 may be made out of the PCB, FPC, metal wire, created through a laser direct structuring (LDS) process, or directly printed onto the ferrite material 204.

In an implementation, the ferrite material 204 may include a highly permeable material embedded in or mounted between the coil antenna 202 and the shield 206. The ferrite material 204 may isolate magnetic fields that are generated by current (not shown) injected into the coil antenna 202 from reaching the shield 206. The isolation of the magnetic fields may reduce adverse effects of metallic materials in the shield 206 to the coil antenna 202. In an implementation, a gap (i.e., space) may be configured between the coil antenna 202 and the ferrite material 204, and/or between the ferrite material 204 and the shield 206. For example, the configured gap (i.e., spaces between the gaps) may be inserted with dielectric materials for mechanical support and stiffness of the modular antenna 200. Furthermore, the modular antenna 200 is configured to maintain the EMI and ESD performance of the host system (e.g., portable device 102) due to protection that is provided by the shield 206, which connects and/or completes the existing EMI/ESD solutions of the host system.

In an implementation, the shield 206 may include a metallic shield structure that encapsulates the coil antenna 202, which is exposed at top layer of the modular antenna 200, and the ferrite materials 204 that is located between the coil antenna 202 and the shield 206. For example, as shown in FIG. 2B, the coil antenna 202 is made out of the PCB and sits on top of a rectangular ring shaped ferrite materials 204. In this example, an outer portion of the coil antenna 202 may define the same plane similar to the plane defined by connecting an outer rim 208 to an inner rim 210 of the shield 206. In other words, the planes defined by the outer rim 208 and the inner rim 210 are aligned with the outer portion of the coil antenna 202.

FIG. 2C illustrates a cross-sectional view 212 of the modular antenna 200. In an implementation, the cross-sectional view 212 illustrates an example embodiment for the modular antenna 200 configuration. For example, the inner rim 210 of the shield 206 may define an extended plane that is aligned with another extended plane defined by the outer rim 208. In this example, top portion 214 (i.e., exposed portion) of the coil antenna 202 may be aligned with the plane defined by connecting the inner rim 210 and the outer rim 208. In this example, a gap 216 (i.e., space) may be allocated between the ferrite material 204 and a bottom portion 218 of the shield 206. In other implementations, another gap (not shown) may be placed between the coil antenna 202 and the ferrite material 204.

In an implementation, the shield 206 may form a rectangular ring shape to adopt the rectangular ring shapes of the encapsulated coil antenna 202 and the ferrite material 204. As shown in the cross-sectional view 212, the shield 206 is configured to form a letter "U" shape with protruding extended flanges that are defined by the inner rim 210 and the outer rim 208. The flanges (i.e., inner 210 and outer rim 208) may be connected to an EMI coating (not shown) to maintain the EMI and ESD integrity of the system hosting the modular antenna 200. The letter "U" shape may include right angles at the corners of the bottom portion 218. In other implementations, the letter "U" shape of the shield 206 may include round angles at the corners of the bottom portion 218.

Figure 3:
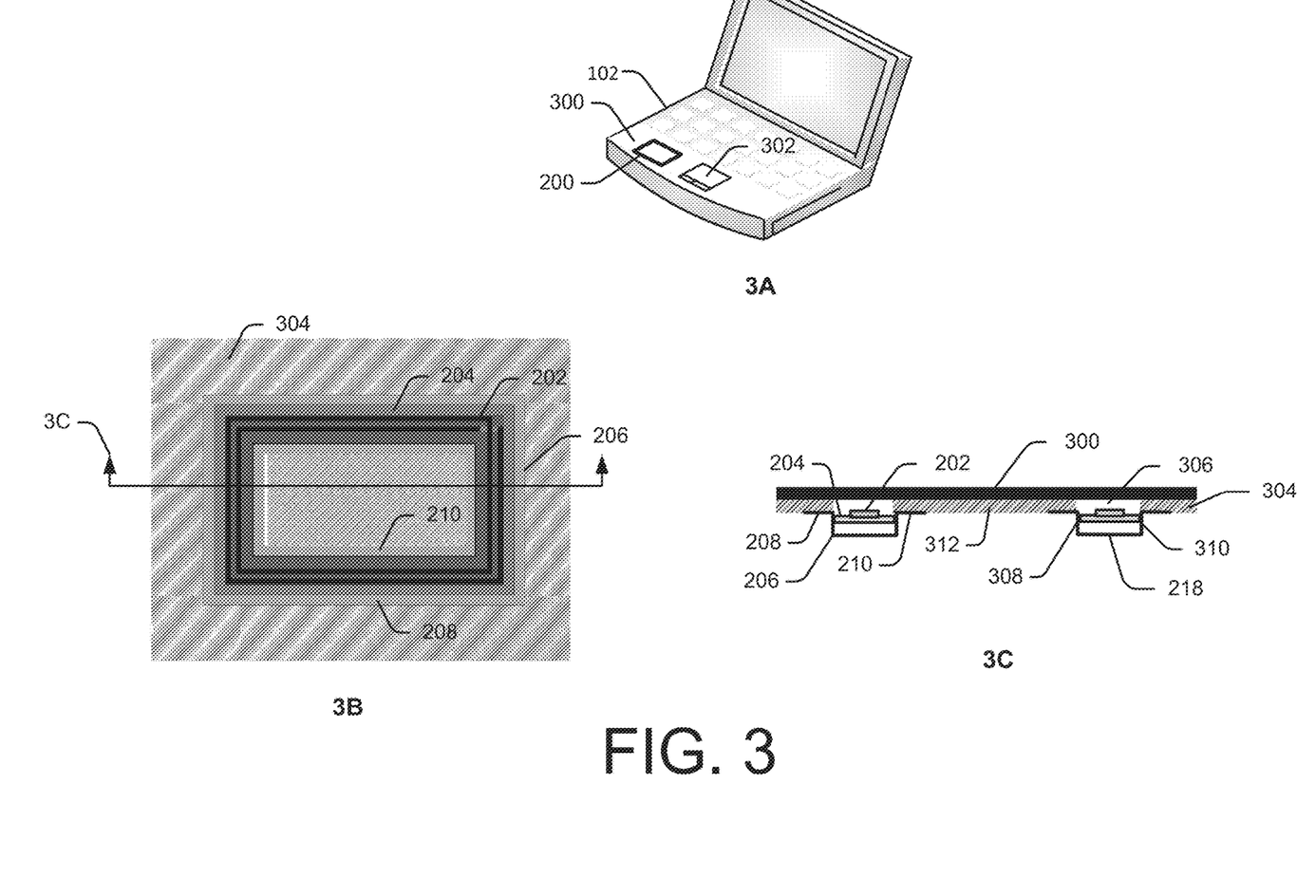
FIG. 3A illustrates an example placement of a modular antenna in a portable device.
FIG. 3B illustrates a top view of a modular antenna placed under a plastic palm rest of a portable device.
FIG. 3C illustrates a cross-sectional view of a modular antenna placed under a plastic palm rest of a portable device.

FIG. 3A illustrates an integration of the modular antenna 200 into the portable device 102. In an implementation, the modular antenna 200 is placed under a plastic palm rest 300 of the portable device 102. The modular antenna 200 may be placed at either side (i.e., left side or right side) of a track pad 302 that is normally located at the middle of the plastic palm rest 300. In other implementations, the modular antenna 200 may be placed at any locations in the portable device 102 (e.g., back of liquid crystal display (LCD) screen), and the modular antenna 200 may provide the same NFC antenna characteristics during NFC and/or WPT operations.

FIG. 3B illustrates a top view of the modular antenna 200 with an EMI coating 304 to maintain the EMI and the ESD integrity of the portable device 102. The top view in FIG. 3B excludes the plastic palm rest 300, which may be integrated as an outer layer for the EMI coating 304. In an implementation, the EMI coating 304 may be used to prevent electromagnetic interferences—generated by electrical components e.g., circuits, data busses, etc, inside the portable device 102—from emitting outside of the host device (e.g., portable device 102) through the plastic palm rest 300. The EMI coating 304 may be made of conductive or magnetic materials to perform electromagnetic shielding of the electrical components (not shown). The integration of the modular antenna 200 may not affect the functionality of the EMI coating 304 to perform electromagnetic shielding because the shield 206 may provide connection continuity between the EMI coating 304.

With continuing reference to FIG. 3C, which is a cross-sectional view of the modular antenna 200 that includes EMI coating 304, portions of EMI coating 304 that are defined by a plane above an opening 306 of the letter "U" shaped shield 206 are removed. The opening 306 may include at least the exposed coil antenna 202. In other words, the removed portion of the EMI coating 304 may adopt the rectangular ring shape of the coil antenna 202.

In an implementation, the letter "U" of the shield 206 encapsulates the coil antenna 202 and the ferrite material 204 in all three sides such that the integration environment has little impact to the modular antenna 200 characteristics. For example, the bottom portion 218, an inner wall 308, and outer wall 310 of the shield 206 enclose the ferrite material 204 and the coil antenna 202. The removed portions of the EMI coating 304 may include a rectangular shape inner EMI coating 312 that is defined by at least the exposed coil antenna 202 of the modular antenna 200. Furthermore, the inner watt 308 may include the extended flat flange inner rim 210, while the outer wall 310 may include the extended flat flange outer rim 208 of the shield 206.

In an implementation, the inner rim 210 and the outer rim 208 may provide a continuity connection between the inner EMI coating 312 and EMI coating 304. In this implementation, the inner EMI coating 312 may include a plane that is flushed against the inner rim 210 of the shield 206. Furthermore, EMI coating 304 is flushed against the outer rim 208 to maintain the isolation of the electrical devices at the portable device 102 from emitting any electromagnetic field outside of the plastic palm rest 300. The ferrite material 204 may help minimize the Eddy current generated on the shield 206 and thereby, maximizes the magnetic field towards the shield opening 306 on top of the shield 206. The maximization of the magnetic field may in turn increases the reading range of the NFC radio during NFC operations.

Figure 4:
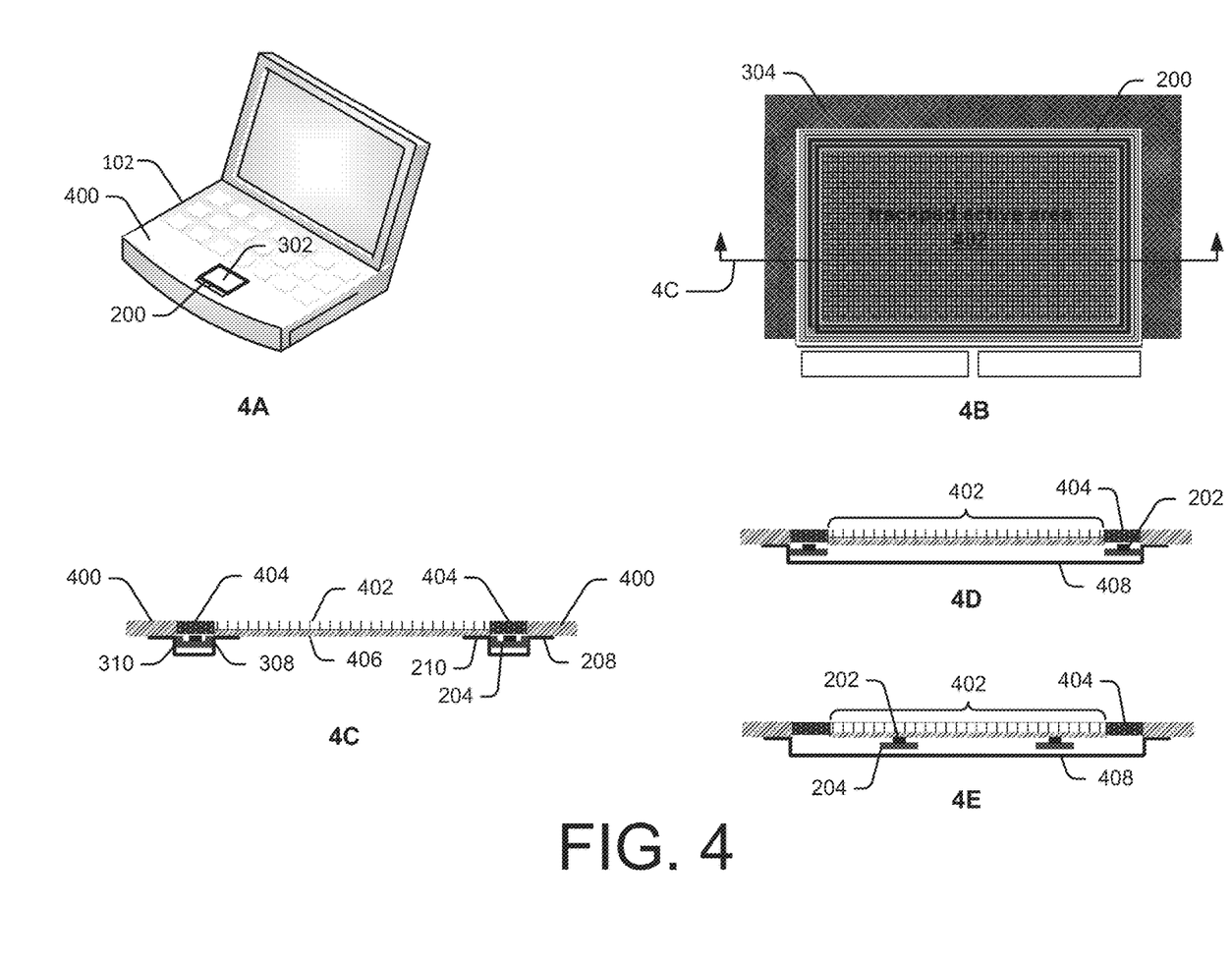
FIG. 4A illustrates an example placement of a modular antenna in a metallic portable device.
FIG. 4B illustrates a top view of a modular antenna placed along a metal free outer circumference of a trackpad active area in a portable device.
FIG. 4C illustrates a cross-sectional view of a modular antenna.
FIG. 4D illustrates a cross-sectional view of a modular antenna that includes a shield that covers an entire trackpad active area.
FIG. 4E illustrates a cross-sectional view of a modular antenna that is smaller than a trackpad active area.

FIG. 4A illustrates another integration embodiment of the modular antenna 200 into the portable device 102. In an implementation, the portable device 102 is a full metallic portable device. In this implementation, the modular antenna 200 is placed around a circumference of the trackpad 302 to perform the NFC functions without compromising the functionality of the trackpad 302, or the EMI and the ESD integrity of the portable device 102. In full metallic portable device designs, the trackpad 302 may be the only component that is allowed to have a cutout on the metallic palm rest 400 of the portable device 102.

FIG. 4B illustrates a top view of the trackpad 302 that includes the metallic palm rest 400 and EMI coating 304 to provide mechanical support and electromagnetic shielding of electrical components within the full metallic portable device 102. In an implementation, the rectangular ring shaped coil antenna 202 of the modular antenna 200 lies on top of a metal free opening (not shown) at an outer circumference of a trackpad active area 402. The trackpad active area 402 may include a grid of vertical and horizontal electrodes and their corresponding ground references/planes to detect position of person's finger (not shown) or a touch-sensitive device (not shown) that is applied against the trackpad 302.

With continuing reference to FIG. 4C, which is a cross-sectional view of the modular antenna 200 that is integrated with the trackpad 302, a metal free opening 404 in the metallic palm rest 400 surrounding the trackpad active area 402 may be added such that the modular antenna 200 may be fitted under a chassis opening while having the coil antenna 202 exposed to provide the same characteristics. Extra dielectric materials (not shown) may be added on top of the coil antenna 202 so that the trackpad active area 402 stays flush mechanically, or the dielectric material (not shown) may be added to the trackpad active area 402 as part of a trackpad PCB (not shown). In an implementation, the outer rim 208 and the inner rim 210 of the shield 206 may connect a trackpad ground 406 and the metallic chassis 400, providing the ESD solution to both the trackpad and the electrical components, and completes the EMI shielding of the full metallic portable device 102. In other implementations, the inner rim 210 and the outer rim 208 may provide continuity connection between trackpad ground 406 plane and the outer metal chassis palm rest 400 that include a middle cut-off portion for the trackpad 302 to provide ESD stability and EMI shielding to the ultrabooks designs.

Furthermore, the ferrite material 204 may extend to the side of the coil antenna 202 to further isolate the coil antenna 202 from the metal shield 206 on the side directions. For example, the ferrite material may form a smaller version of encapsulating ferrite material 204 (i.e., small U-shape) that protects the sides of the coil antenna 202 from the inner wall 308 and the outer wall 310 of the shield 206. In this example, a gap (not shown) may be inserted between the side of the extended ferrite material 204 and the side walls 308 and 310 of the shield 206.

In other implementations, as shown in FIG. 4D, the coil antenna 202 is placed around the outer circumference defined by the metal free opening 404 of the trackpad 302, and printed on the same PCB (not shown) as the trackpad circuit. In this implementation, the ferrite material 204 is attached to the bottom of the trackpad circuit PCB (not shown) in a rectangular ring shape to provide isolation between the coil antenna 202 and the shield 206. In other implementations, the ferrite material 204 may cover the entire trackpad area 402. Furthermore, the shield 206 may cover the entire trackpad area 402 with a bottom portion 408 that is fully extended to cover the entire trackpad active area 402. In other words, the shield 206 does not have an opening in the middle as shown in FIG. 4D. In this implementation, the bottom portion 408 is grounded to provide the EMI and ESD stability in the full metallic portable device 102.

In other implementations, as shown in 4E, the coil antenna 202 may be smaller than the trackpad active area 402. In other words, the coil antenna 202 sits behind the active area 402 after assembly or integration. In combination with certain ground plane pattern, the coil antenna 202 may be able to function as an effective NFC antenna. The shield 206 may also have one or more transverse slot cut (not shown) to stop the circulating the Eddy current due to the current induced by the coil antenna 202.

Figure 5:
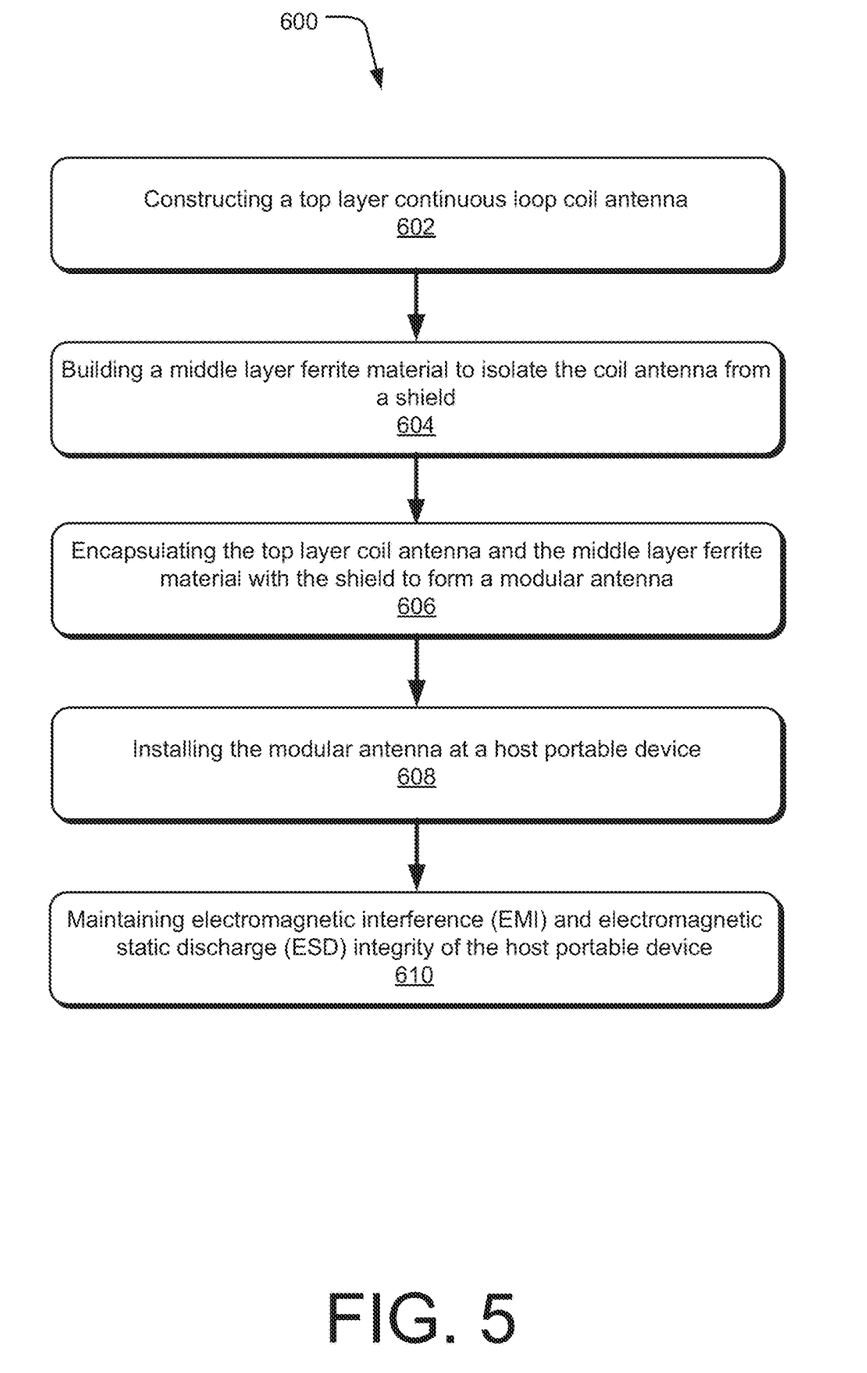
FIG. 5 illustrates an exemplary implementation of a modular antenna with a transverse slot cut in a shield.

FIG. 5 illustrates example configuration of the shield 206 of the modular antenna 200. In an implementation, the shield 206 may contain thin slots cut 500 across one or more edges of the ring shape shield 206 (including the flanges 210 and 208) to break a circulating current that may be induced by the current (not shown) on the coil antenna 202. In this implementation, the shield 206 when used in conjunction with EMI coating patterns with slot may improve the NFC performance of the modular antenna 200.

Figure 6:
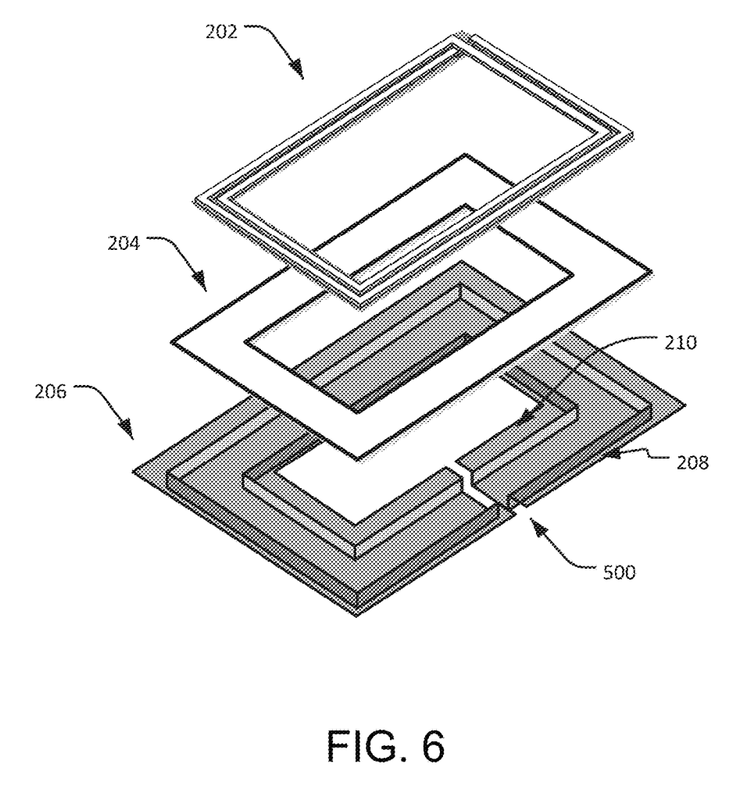
FIG. 6 is a method for coupling a portable device to facilitate near field coupling.

FIG. 6 shows an example process chart illustrating an example method 600 for integrating modular antenna at a portable device to facilitate near field communications. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, constructing a top layer continuous loop coil antenna is performed. In an implementation, the top layer continuous loop of coil antenna (e.g., coil antenna 202) may include at least one exposed loop to form a ring shaped coil antenna 202. The coil antenna 202 may be made out of the PCB, FPC, a metal wire, created through a laser direct structuring (LDS) process, or directly printed onto a ferrite material (e.g., ferrite material 204).

At block 604, building a middle layer ferrite material is performed. In an implementation, the coil antenna 202 may be embedded to the middle layer ferrite material 204 that isolates the rectangular ring shaped coil antenna 202 from a metallic shield (e.g., shield 206). In other implementations, the coil antenna 202 may form shapes other than the rectangular ring shape. Furthermore, a gap (e.g., gap 216) may be placed at least between the ferrite material 204 and the shield 206, or between the coil antenna 202 and the ferrite material 204. The gap 216 may be inserted with dielectric materials for mechanical support. In other implementations, the ferrite material 204 may extend to the side of the coil antenna 202 to further isolate the coil antenna 202 from the shield 206 on the side directions (e.g., inner wall 308 and outer wall 310).

At block 606, encapsulating the coil antenna and the ferrite material with the shield to form a modular antenna is performed. In an implementation, the shield 206 may include a letter "U" configuration to encapsulate the top layer coil antenna 202 and the middle layer ferrite material 204 in all three sides to form a modular antenna (e.g., modular antenna 200). For example, the three sides are defined by a bottom portion (e.g., bottom portion 218), an outer wall (e.g., outer wall 310), and an inner wall (e.g., inner wall 308) of the letter "U" shield 206. Furthermore, the shield 206 may include the outer wall 310 that has an extended outer rim (e.g., outer rim 208), while the inner wall 308 has an extended inner rim (e.g., inner rim 210). In other implementations, the metal shield 206 may employ one or more transverse slot cut (e.g., slot cut 500) to stop the circulating current that the current on the coil antenna may induce.

At block 608, installing the modular antenna at a host portable device is performed. In all implementation, the modular antenna 200 may be integrated under a plastic palm rest (e.g., plastic palm rest 300) of a host portable device (e.g., portable device 102). In other implementation, the modular antenna is placed at a metal free opening (e.g., metal free opening 404) of a full metallic chassis ultrabooks. For example, the metal free opening 404 may be located around an outer circumference of a trackpad active area (e.g., trackpad active area 402). In this example, the coil antenna 202 of the modular antenna 200 may be embedded to a trackpad PCB of the ultrabooks portable device.

At block 610, maintaining EMI and ESD integrity of the host portable device is performed. In an implementation, the outer rim 208 connects an EMI coating (e.g., EMI coating 304) to a cut-off portion (e.g., inner EMI coating 312) of the EMI coating 304 through the inner rim 210. In this implementation, the modular antenna 200 maintains the EMI and the ESD integrity of the host portable device. Furthermore, the modular antenna 200 maintains the same coil antenna characteristics by shielding the coil antenna 202 from electrical components of the portable device 102. In other implementations, such as in full metallic chassis ultrabooks, the cut-off portion (i.e., inner EMI coating 312) is not implemented; however, portions of the metallic palm rest 400 are removed as a hole similar to the size of the modular antenna 200. In this implementation, the shield 206 is grounded to maintain the EMI and the ESD integrity of the full metallic chassis ultrabooks.

Realizations in accordance with the present invention have been described in the context of particular embodiments. These embodiments are meant to be illustrative and not limiting. Many variations, modifications, additions, and improvements are possible.

Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A portable device comprising:
one or more processors;
a near field communication (NFC) module operatively coupled to the one or more processors; and
a modular antenna connected to the NFC module comprising:
a layer continuous loop that includes at least one coil antenna loop; a layer of ferrite material that isolates the coil antenna; and a shield to encapsulate the top layer coil antenna and the layer ferrite material along three sides, which are defined by a bottom portion, an outer wall, and an inner wall of the shield, wherein the shield includes an outer rim and an inner rim to maintain the same coil antenna characteristics in the modular antenna, wherein the shield exposes the encapsulated coil antenna and the ferrite material outside of an electromagnetic interference (EMI) coating that shields electrical components within a portable device, and wherein the shield includes one or more transverse slots cut to limit circulating Eddy currents.

2. The portable device as recited in claim 1, wherein the coil antenna includes an antenna made out of a printed circuit board (PCB), a flexible printed circuit (FPC), and a metal wire, which are created through a laser direct structuring (LDS) process, or directly printed onto the ferrite material.

3. The portable device as recited in claim 1, wherein the ferrite material protects the coil antenna from Eddy currents that may be induced on the shield, and blocks magnetic fields at the coil antenna from reaching the shield, wherein the ferrite material is extended along side walls of the shield.

4. The portable device as recited in claim 1, wherein a gap is allocated at least between the ferrite material and the bottom or side portion of the shield, or between the coil antenna and the ferrite material, wherein the gap is inserted with dielectric materials for mechanical support and stiffness of the modular antenna.

5. The portable device as recited in claim 1, wherein the shield that encapsulates the coil antenna and the ferrite material integrates the NFC module to form a single module.

6. A portable device comprising:
one or more processors;
a near field communication (NFC) module operatively coupled to the one or more processors; and
a modular antenna connected to the NFC module comprising:
a layer continuous loop that includes at least one coil antenna loop; a layer of ferrite material that isolates the coil antenna; and a shield to encapsulate the top layer coil antenna and the layer ferrite material along three sides, which are defined by a bottom portion, an outer wall, and an inner wall of the shield, wherein the shield includes an outer rim and an inner rim to maintain the same coil antenna characteristics in the modular antenna
wherein the shield includes the inner rim and the outer rim, which provide continuity connection between an inner electromagnetic interference (EMI) coating and an outer EMI coating that includes a middle cut-off portion of the EMI coating, or between trackpad ground plane and outer metal chassis palm rest that include a middle cut-off portion for the trackpad to provide electromagnetic static discharge (ESD) stability and EMI shielding.

7. A modular antenna comprising:
a top layer continuous loop of coil antenna that includes at least one coil antenna loop; a middle layer of ferrite material that isolates the coil antenna from a shield; and
a shield that is isolated by the ferrite material from the coil antenna, that encapsulates the top layer coil antenna and the middle layer ferrite material in three sides which are defined by a bottom portion, an outer wall, and an inner wall of the shield, wherein the shield includes an outer rim and an inner rim to maintain the same coil antenna characteristics in the modular antenna, wherein the shield that encapsulates the coil antenna and the ferrite material integrates a near field communication (NFC) module to form a single module, wherein the shield includes at least one slot cut to limit an induced Eddy current on the shield.

8. The modular antenna as recited in claim 7, wherein the coil antenna includes a ring shaped coil antenna made out of a printed circuit board (PCB), a flexible printed circuit (FPC), and a metal wire, which are created through a laser direct structuring (LDS) process, or directly printed onto the ferrite material.

9. The modular antenna as recited in claim 7, wherein the ferrite material protects the coil antenna from Eddy currents induced on the shield, and blocks magnetic fields at the coil antenna from reaching the shield, wherein the ferrite material is extended to form a smaller U-shape configuration to protect side walls of the coil antenna from the shield.

10. The modular antenna as recited in claim 7, wherein a gap is allocated at least between the ferrite material and the bottom or side portion of the shield, or between the coil antenna and the ferrite material, wherein the gap is inserted with dielectric materials for mechanical support and stiffness of the modular antenna.

11. The modular antenna as recited in claim 7, wherein the shield exposes the encapsulated coil antenna and the ferrite material outside of an electromagnetic interference (EMI) coating that shields electrical components within a portable device.

12. The modular antenna as recited in claim 7, wherein the shield includes metallic components that are fitted into metal free outer circumference of a trackpad active area in a full metal chassis device, wherein the coil antenna is exposed for near field communication (NFC) and/or wireless power transfer (WPT) purposes.

13. A method of manufacturing a modular antenna that is integrated into a host portable device comprising:
constructing a top layer continuous loop of coil antenna that includes at least one coil antenna loop;
building a middle layer of ferrite material that isolates the coil antenna from a shield; and
encapsulating the top layer coil antenna and the middle layer ferrite material with the shield to form the modular antenna, wherein the shield forms a U-shape shield to encapsulate the top layer coil antenna and the middle layer ferrite material in all three sides, which are defined by a bottom portion, an outer wall, and an inner wall of the U-shape shield, wherein the U-shape shield includes an outer rim and an inner rim to maintain the same coil antenna characteristics in the modular antenna; wherein the shield that encapsulates the top coil antenna and the middle layer ferrite material integrates a near field communication (NFC) module to form a single module, wherein the shield includes at least one slot cut to limit an induced Eddy current on the shield.

14. The method as recited in claim 13, wherein the constructing a top layer continuous loop of coil antenna includes a ring shaped coil antenna that is made out of a printed circuit board (PCB), a flexible printed circuit (FPC), and a metal wire, which are created through a laser direct structuring (LDS) process, or directly printed onto the ferrite material.

15. The method as recited in claim 13, wherein the coil antenna is interfaced to a near field communication (NFC) module through the PCB, the FPC, or through wire connections.

16. The method as recited in claim 13, wherein the encapsulating includes providing a gap allocated at least between the ferrite material and the bottom or side portion of the shield, or between the coil antenna and the ferrite material, wherein the gap is inserted with dielectric materials for mechanical support and stiffness of the modular antenna.

17. The method as recited in claim 13, further comprising integrating of the modular antenna to a trackpad printed circuit board (PCB) in full metal chassis device designs.

18. The method as recited in claim 13, further comprising integrating a near field communication (NFC) module with the modular antenna to form a single module.

* * * * *